(12) United States Patent
Zhang et al.

(10) Patent No.: US 10,187,879 B2
(45) Date of Patent: *Jan. 22, 2019

(54) RESOURCE ALLOCATION METHOD AND APPARATUS

(71) Applicant: Huawei Technologies Co., Ltd., Shenzhen, Guangdong (CN)

(72) Inventors: Jian Zhang, Shenzhen (CN); Hongping Zhang, Shanghai (CN); Qinghai Zeng, Shanghai (CN); Yan Wang, Beijing (CN); Liangliang Zhang, Beijing (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

This patent is subject to a terminal disclaimer.

(21) Appl. No.: 15/912,233

(22) Filed: Mar. 5, 2018

(65) Prior Publication Data

US 2018/0199337 A1    Jul. 12, 2018

Related U.S. Application Data

(63) Continuation of application No. 15/420,981, filed on Jan. 31, 2017, now Pat. No. 9,942,885, which is a
(Continued)

(51) Int. Cl.
*H04W 52/36*    (2009.01)
*H04W 72/04*    (2009.01)
(Continued)

(52) U.S. Cl.
CPC ....... *H04W 72/0413* (2013.01); *H04L 5/0035* (2013.01); *H04W 52/04* (2013.01);
(Continued)

(58) Field of Classification Search
CPC ........... H04W 52/365; H04W 72/0413; H04W 72/042; H04W 52/146; H04W 88/02;
(Continued)

(56) References Cited

U.S. PATENT DOCUMENTS 9,609,635 B2    3/2017   Zhang et al.
9,615,338 B2    4/2017   Kim et al.
(Continued)

FOREIGN PATENT DOCUMENTS

CN    101296475 A    10/2008
CN    101777942 A    7/2010
(Continued)

OTHER PUBLICATIONS

"3rd Generation Partnership Project; Technical Specification Group Radio Access Network; Evolved Universal Terrestrial Radio Access {E-UTRA) and Evolved Universal Terrestrial Radio Access Network (E-UTRAN); Overall description; Stage 2 (Release 11)", 3GPP TS 36.300 V11.4.0, Dec. 2012, 208 pages.

(Continued)

*Primary Examiner* — Nimesh Patel

(57) ABSTRACT

By using a method for coordination between base stations, one base station allocates a resource to user equipment in a better manner with reference to resource configuration information saved in the base station and resource configuration information of another base station. The method provided in the embodiments of the present invention includes: acquiring, by a first base station, resource configuration information of a first cell, where the first cell is a cell served by the first base station; receiving resource configuration information of a second cell sent by a second base station, where the second cell is a cell served by the second base station; and allocating a resource to user equipment according to the resource configuration information of the first cell and the resource configuration information of the second cell, so that the user equipment communicates with the first cell and the second cell.

20 Claims, 3 Drawing Sheets

Related U.S. Application Data continuation of application No. 14/830,483, filed on Aug. 19, 2015, now Pat. No. 9,609,635, which is a continuation of application No. PCT/CN2013/071702, filed on Feb. 20, 2013.

(51) Int. Cl.

| | | |
|---|---|---|
| *H04W 52/04* | (2009.01) | |
| *H04L 5/00* | (2006.01) | |
| *H04W 52/14* | (2009.01) | |
| *H04W 76/40* | (2018.01) | |
| *H04W 88/02* | (2009.01) | |
| *H04W 88/08* | (2009.01) | |

(52) U.S. Cl.
CPC ....... *H04W 52/146* (2013.01); *H04W 52/365* (2013.01); *H04W 72/0426* (2013.01); *H04W 72/0473* (2013.01); *H04W 76/40* (2018.02); *H04W 72/0453* (2013.01); *H04W 88/02* (2013.01); *H04W 88/08* (2013.01)

(58) Field of Classification Search
CPC ............. H04W 72/0446; H04W 52/34; H04W 52/367; H04W 88/08; H04W 52/325; H04W 76/15; H04W 4/70; H04W 88/06; H04W 72/00; H04W 72/04
See application file for complete search history.

(56) References Cited

U.S. PATENT DOCUMENTS

| | | | |
|---|---|---|---|
| 9,942,885 B2* | 4/2018 | Zhang | ............... H04W 72/0413 |
| 2008/0167003 A1 | 7/2008 | Wang et al. | |
| 2009/0290550 A1 | 11/2009 | Bhattad et al. | |
| 2011/0207487 A1 | 8/2011 | Yang et al. | |
| 2011/0268007 A1 | 11/2011 | Barany et al. | |
| 2011/0312366 A1 | 12/2011 | Yang et al. | |
| 2012/0044882 A1 | 2/2012 | Kim et al. | |
| 2012/0282964 A1 | 11/2012 | Xiao et al. | |
| 2013/0114457 A1 | 5/2013 | Han et al. | |
| 2013/0114524 A1 | 5/2013 | Sirotkin et al. | |
| 2014/0011507 A1 | 1/2014 | Bhattad et al. | |

FOREIGN PATENT DOCUMENTS

| | | |
|---|---|---|
| CN | 101895940 A | 11/2010 |
| CN | 102037774 A | 4/2011 |
| CN | 102264105 A | 11/2011 |
| CN | 102932797 A | 2/2013 |
| EP | 2675235 A1 | 12/2013 |
| KR | 20120084665 A | 7/2012 |
| WO | 2011109544 A1 | 9/2011 |
| WO | 2012106848 A1 | 8/2012 |

OTHER PUBLICATIONS

"3rd Generation Partnership Project; Technical Specification Group Radio Access Network; Evolved Universal Terrestrial Radio Access (E-UTRA}; Medium Access Control (MAC) protocol specification (Release 11)", 3GPP TS 36.321 V11.1.0, Dec. 2012, 57 pages.

"3rd Generation Partnership Project; Technical Specification Group Radio Access Network; Evolved Universal Terrestrial Radio Access (E-UTRA); Radio Resource Control (RRC); Protocol specification (Release 11)", 3GPP TS 36.331 V11.2.0, Dec. 2012, 340 pages.

"3rd Generation Partnership Project; Technical Specification Group Radio Access Network; Evolved Universal Terrestrial Radio Access (E-UTRA); X2 application protocol (X2AP) {Release 11)", 3GPP TS 36.423 V11.3.0, Dec. 2012, 141 pages.

"3rd Generation Partnership Project; Technical Specification Group Radio Access Network; Evolved Universal Terrestrial Radio Access (E-UTRA); User Equipment (UE) radio transmission and reception (Release 11)", 3GPP TS 36.101 V11.3.0, Dec. 2012, 392 pages.

* cited by examiner

RESOURCE ALLOCATION METHOD AND APPARATUS

CROSS-REFERENCE TO RELATED APPLICATIONS

This application is a continuation of U.S. patent application Ser. No. 15/420,981, filed on Jan. 31, 2017, which is a continuation of U.S. patent application Ser. No. 14/830,483, filed on Aug. 19, 2015, now U.S. Pat. No. 9,609,635, which is a continuation of International Application No. PCT/CN2013/071702, filed on Feb. 20, 2013. All of the aforementioned patent applications are hereby incorporated by reference in their entireties.

TECHNICAL FIELD

The present invention relates to the communications field, and in particular, to a resource allocation method and an apparatus.

BACKGROUND

A Long Term Evolution system (Long Term Evolution, LTE for short) supports a coordinated multi-point (Coordinated Multi-Point, CoMP for short) transmission technology, so as to reduce cell edge interference and improve a cell edge throughput; and supports a carrier aggregation (Carrier Aggregation, CA for short) technology, so as to improve a peak data rate, an average cell throughput, and the like. The CoMP transmission technology refers to that multiple geographically separated transmission points work coordinately to send data for user equipment or jointly receive data sent by user equipment. The CA technology refers to that user equipment acquires larger transmission bandwidth by means of aggregation of multiple component carriers (Component Carrier, CC for short), where a cell that participates in carrier aggregation may be referred to as a serving cell (serving cell).

In a process of using the CoMP transmission technology and/or the CA technology, the inventor finds that when transmission points that participate in CoMP or carriers aggregated by user equipment are provided by different base stations, because there is no method for transferring resource configuration information between base stations in the prior art, coordination with other base stations fails to be implemented in resource allocation for user equipment, causing improper resource allocation.

SUMMARY

The present invention provides a resource allocation method and an apparatus, so as to properly allocate, between base stations, a resource to a user equipment.

To achieve the foregoing objective, the present invention uses the following technical solutions:

According to a first aspect, a resource allocation method is provided, including:

acquiring, by a first base station, resource configuration information of a first cell, where the first cell is a cell served by the first base station;

receiving, by the first base station, resource configuration information of a second cell sent by a second base station, where the second cell is a cell served by the second base station; and allocating, by the first base station, a resource to the user equipment according to the resource configuration information of the first cell and the resource configuration information of the second cell, so that the user equipment communicates with the first cell and the second cell, where:

the resource configuration information includes at least one of the following:

maximum allowable transmit power of a cell, uplink power control common configuration information, uplink sounding reference signal common configuration information, Multimedia Broadcast multicast service Single Frequency Network subframe configuration information, physical uplink shared channel common configuration information, physical downlink shared channel common configuration information, and channel state reference signal configuration information.

In a first possible implementation manner, according to the first aspect, after the receiving resource configuration information of a second cell sent by a second base station, the method further includes:

sending the resource configuration information of the first cell to the second base station, so that the second base station allocates a resource to the user equipment according to the resource configuration information of the first cell and the resource configuration information of the second cell.

In a second possible implementation manner, with reference to the first aspect or the first possible implementation manner, when the resource configuration information of the second cell is updated, the method further includes:

receiving updated resource configuration information of the second cell; and allocating a resource to the user equipment according to the resource configuration information of the first cell and the updated resource configuration information of the second cell.

In a third possible implementation manner, with reference to any one of the first aspect, the first possible implementation manner, and the second possible implementation manner, when the resource configuration information of the first cell is updated, the method further includes:

sending updated resource configuration information of the first cell to the second base station, so that the second base station allocates a resource to the user equipment according to the updated resource configuration information of the first cell and the resource configuration information of the second cell.

In a fourth possible implementation manner, with reference to the first aspect or any one of the first possible implementation manner to the third possible implementation manner, when a cell that communicates with the user equipment is updated, the method further includes:

acquiring an identifier of the updated cell, and sending the identifier of the updated cell to the second base station; or receiving an identifier of the updated cell sent by the second base station.

In a fifth possible implementation manner, with reference to the first aspect or any one of the first possible implementation manner to the third possible implementation manner, when the resource configuration information includes maximum allowable transmit power of a cell, the allocating a resource to the user equipment according to the resource configuration information of the first cell and the resource configuration information of the second cell includes:

allocating a resource to the user equipment according to maximum allowable transmit power of the first cell and maximum allowable transmit power of the second cell, so that uplink transmit power of the user equipment does not exceed the maximum allowable transmit power of either of the first cell and the second cell.

In a sixth possible implementation manner, with reference to the first aspect or any one of the first possible implementation manner to the fifth possible implementation manner, when the resource configuration information includes uplink power control common configuration information, the allocating a resource to the user equipment according to the resource configuration information of the first cell and the resource configuration information of the second cell includes:

sending uplink power control common configuration information of the first cell and uplink power control common configuration information of the second cell to the user equipment, so that the user equipment acquires power headroom report PHR information according to the uplink power control common configuration information of the first cell and that of the second cell, where the PHR information includes power headroom of the first cell and/or that of the second cell;

receiving the PHR information sent by the user equipment; and allocating an uplink resource to the user equipment according to the PHR information.

In a seventh possible implementation manner, with reference to the first aspect or any one of the first possible implementation manner to the sixth possible implementation manner, when the resource configuration information includes uplink sounding reference signal common configuration information, the allocating a resource to the user equipment according to the resource configuration information of the first cell and the resource configuration information of the second cell includes:

allocating an uplink resource to the user equipment, where a symbol location occupied by the uplink resource does not include a symbol location that is in a subframe and is occupied by an uplink sounding reference signal resource of either of the first cell and the second cell.

In an eighth possible implementation manner, with reference to the first aspect or any one of the first possible implementation manner to the seventh possible implementation manner, when the resource configuration information includes Multimedia Broadcast multicast service Single Frequency Network subframe configuration information, the allocating a resource to the user equipment according to the resource configuration information of the first cell and the resource configuration information of the second cell includes:

allocating a downlink resource to the user equipment, where a subframe occupied by the downlink resource does not include a Multimedia Broadcast multicast service Single Frequency Network subframe that is of either of the first cell and the second cell and is occupied by a Multimedia Broadcast multicast service; or when no Multimedia Broadcast multicast service uses a Multimedia Broadcast multicast service Single Frequency Network subframe of the first cell or that of the second cell, allocating, in a Multimedia Broadcast multicast service Single Frequency Network subframe of the first cell or that of the second cell, a downlink resource to the user equipment.

In a ninth possible implementation manner, with reference to the first aspect or any one of the first possible implementation manner to the eighth possible implementation manner, when the resource configuration information includes physical uplink shared channel common configuration information, the allocating a resource to the user equipment according to the resource configuration information of the first cell and the resource configuration information of the second cell includes:

allocating an uplink resource to the user equipment according to physical uplink shared channel common configuration information of the first cell and physical uplink shared channel common configuration information of the second cell.

In a tenth possible implementation manner, with reference to the first aspect or any one of the first possible implementation manner to the ninth possible implementation manner, when the resource configuration information includes physical downlink shared channel common configuration information, the allocating a resource to the user equipment according to the resource configuration information of the first cell and the resource configuration information of the second cell includes:

allocating a downlink resource to the user equipment according to physical downlink shared channel common configuration information of the first cell and physical downlink shared channel common configuration information of the second cell.

In an eleventh possible implementation manner, with reference to the first aspect or any one of the first possible implementation manner to the tenth possible implementation manner, when the resource configuration information includes channel state reference signal configuration information, the allocating a resource to the user equipment according to the resource configuration information of the first cell and the resource configuration information of the second cell includes:

sending channel state reference signal configuration information of the first cell and channel state reference signal configuration information of the second cell to the user equipment, so that the user equipment acquires reference signal received power and/or channel state information according to the channel state reference signal configuration information of the first cell and the channel state reference signal configuration information of the second cell;

receiving the reference signal received power and/or channel state information sent by the user equipment; and allocating a downlink resource to the user equipment according to the reference signal received power and/or channel state information.

In a twelfth possible implementation manner, with reference to the first aspect or any one of the first possible implementation manner to the eleventh possible implementation manner, in a coordinated multi-point CoMP transmission technology, the first cell or the second cell is a transmission point of the user equipment; or in a carrier aggregation CA technology, the first cell or the second cell is a serving cell of the user equipment.

According to a second aspect, a base station is provided, including: an acquiring unit, a receiving unit, and a processing unit, where:

the acquiring unit is configured to acquire resource configuration information of a first cell, where the first cell is a cell served by the base station; and transmit the resource configuration information of the first cell to the processing unit;

the receiving unit is configured to receive resource configuration information of a second cell of a second base station and transmit the resource configuration information of the second cell to the processing unit, where the second cell is a cell served by the second base station; and the processing unit is configured to allocate a resource to the user equipment according to the resource configuration information of the first cell transmitted by the acquiring unit and the resource configuration information of the second cell transmitted by the receiving unit, so that the user equipment communicates with the first cell and the second cell, where:

the resource configuration information includes at least one of the following:

maximum allowable transmit power of a cell, uplink power control common configuration information, uplink sounding reference signal common configuration information, Multimedia Broadcast multicast service Single Frequency Network subframe configuration information, physical uplink shared channel common configuration information, physical downlink shared channel common configuration information, and channel state reference signal configuration information.

In a first possible implementation manner, according to the second aspect, the base station further includes:

a sending unit, configured to send the resource configuration information of the first cell to the second base station, so that the second base station allocates a resource to the user equipment according to the resource configuration information of the first cell and the resource configuration information of the second cell.

In a second possible implementation manner, with reference to the second aspect or the first possible implementation manner, when the resource configuration information of the second cell is updated, the receiving unit is further configured to receive updated resource configuration information of the second cell; and the processing unit is further configured to allocate a resource to the user equipment according to the resource configuration information of the first cell and the updated resource configuration information of the second cell.

In a third possible implementation manner, with reference to any one of the second aspect, the first possible implementation manner, and the second possible implementation manner, when the resource configuration information of the first cell is updated, the sending unit is further configured to send updated resource configuration information of the first cell to the second base station, so that the second base station allocates a resource to the user equipment according to the updated resource configuration information of the first cell and the resource configuration information of the second cell.

In a fourth possible implementation manner, with reference to the second aspect or any one of the first possible implementation manner to the third possible implementation manner, when a cell that communicates with the user equipment is updated, the acquiring unit is further configured to acquire an identifier of the updated cell; and the sending unit is further configured to send the identifier of the updated cell to the second base station; or when a cell that communicates with the user equipment is updated, the receiving unit is further configured to receive an identifier of the updated cell sent by the second base station.

In a fifth possible implementation manner, with reference to the second aspect or anyone of the second possible implementation manner to the fourth possible implementation manner, when the resource configuration information includes maximum allowable transmit power of a cell, the processing unit is specifically configured to allocate a resource to the user equipment according to maximum allowable transmit power of the first cell and maximum allowable transmit power of the second cell, so that uplink transmit power of the user equipment does not exceed the maximum allowable transmit power of either of the first cell and the second cell.

In a sixth possible implementation manner, with reference to the second aspect or anyone of the second possible implementation manner to the fourth possible implementation manner, when the resource configuration information includes uplink power control common configuration information, the processing unit is specifically configured to send uplink power control common configuration information of the first cell and uplink power control common configuration information of the second cell to the user equipment, so that the user equipment acquires power headroom report PHR information according to the uplink power control common configuration information of the first cell and that of the second cell, where the PHR information includes power headroom of the first cell and/or that of the second cell; receive the PHR information sent by the user equipment; and allocate an uplink resource to the user equipment according to the PHR information.

In a seventh possible implementation manner, with reference to the second aspect or any one of the first possible implementation manner to the sixth possible implementation manner, when the resource configuration information includes uplink sounding reference signal common configuration information, the processing unit is specifically configured to allocate an uplink resource to the user equipment, where a symbol location occupied by the uplink resource does not include a symbol location that is in a subframe and is occupied by an uplink sounding reference signal resource of either of the first cell and the second cell.

In an eighth possible implementation manner, with reference to the second aspect or any one of the first possible implementation manner to the seventh possible implementation manner, when the resource configuration information includes Multimedia Broadcast multicast service Single Frequency Network subframe configuration information, the processing unit is specifically configured to allocate a downlink resource to the user equipment, where a subframe occupied by the downlink resource does not include a Multimedia Broadcast multicast service Single Frequency Network subframe that is of either of the first cell and the second cell and is occupied by a Multimedia Broadcast multicast service; or when no Multimedia Broadcast multicast service uses a Multimedia Broadcast multicast service Single Frequency Network subframe of the first cell or that of the second cell, allocate, in a Multimedia Broadcast multicast service Single Frequency Network subframe of the first cell or that of the second cell, a downlink resource to the user equipment.

In a ninth possible implementation manner, with reference to the second aspect or any one of the first possible implementation manner to the eighth possible implementation manner, when the resource configuration information includes physical uplink shared channel common configuration information, the processing unit is specifically configured to allocate an uplink resource to the user equipment according to physical uplink shared channel common configuration information of the first cell and physical uplink shared channel common configuration information of the second cell.

In a tenth possible implementation manner, with reference to the second aspect or any one of the first possible implementation manner to the ninth possible implementation manner, when the resource configuration information includes physical downlink shared channel common configuration information, the processing unit is specifically configured to allocate a downlink resource to the user equipment according to physical downlink shared channel common configuration information of the first cell and physical downlink shared channel common configuration information of the second cell.

In an eleventh possible implementation manner, with reference to the second aspect or any one of the first possible implementation manner to the tenth possible implementation manner, when the resource configuration information includes channel state reference signal configuration information, the processing unit is specifically configured to send channel state reference signal configuration information of the first cell and channel state reference signal configuration information of the second cell to the user equipment, so that the user equipment acquires reference signal received power and/or channel state information according to the channel state reference signal configuration information of the first cell and the channel state reference signal configuration information of the second cell; receive the reference signal received power and/or channel state information sent by the user equipment; and allocate a downlink resource to the user equipment according to the reference signal received power and/or channel state information.

In a twelfth possible implementation manner, with reference to the second aspect or any one of the first possible implementation manner to the eleventh possible implementation manner, in a coordinated multi-point CoMP transmission technology, the first cell or the second cell is a transmission point of the user equipment; or in a carrier aggregation CA technology, the first cell or the second cell is a serving cell of the user equipment.

According to the resource allocation method and base station that are provided in the embodiments of the present invention, a resource is allocated to user equipment according to resource configuration information of a first cell served by a first base station and that of a second cell served by a second base station. That is, when the first base station allocates a resource, not only the resource configuration information of the first base station is considered but also the resource configuration information of the second base station is taken into account. By using the method for coordination between base stations, a resource can be properly allocated, between base stations, to user equipment, which helps improve a peak data rate and a cell throughput or reduce interference.

BRIEF DESCRIPTION OF THE DRAWINGS

To describe the technical solutions in the embodiments of the present invention more clearly, the following briefly introduces the accompanying drawings required for describing the embodiments or the prior art. Apparently, the accompanying drawings in the following description show merely some embodiments of the present invention, and a person of ordinary skill in the art may still derive other drawings from these accompanying drawings without creative efforts.

DETAILED DESCRIPTION

The following clearly describes the technical solutions in the embodiments of the present invention with reference to the accompanying drawings in the embodiments of the present invention. Apparently, the described embodiments are merely a part rather than all of the embodiments of the present invention. All other embodiments obtained by a person of ordinary skill in the art based on the embodiments of the present invention without creative efforts shall fall within the protection scope of the present invention.

A resource allocation method provided in an embodiment of the present invention may be applied to a Long Term Evolution system (Long Term Evaluation, LTE for short), a Universal Mobile Telecommunications System (Universal Mobile Telecommunications System, UMTS for short) system, a Code Division Multiple Access (Code Division Multiple Access, CDMA for short) system, and the like and is mainly applied to a Coordinated Multi-Point (Coordinated Multi-Point, CoMP for short) transmission technology and a carrier aggregation (Carrier Aggregation, CA for short) technology that are supported by the systems.

A transmission point in the CoMP transmission technology generally refers to different cells (cell) or different channel state information-reference signal (Channel State Information-Reference Signal, CSI-RS) configurations in a cell, that is, one transmission point may correspond to one cell or one set of CSI-RS configurations in one cell, and for the latter, one cell may correspond to multiple transmission points, and a set consisting of all transmission points that perform coordinated communication with user equipment is referred to as a CoMP resource management set or a CoMP resource measurement set of the user equipment; a network element corresponding to a transmission point may be a base station, a relay node, a remote radio head (Remote Radio Head, RRH for short), a remote radio unit (Remote Radio Unit, RRU for short), an antenna port (antenna port), and the like.

In the CoMP transmission technology, one user equipment has only one serving cell, and another cell that communicates with the user equipment is referred to as a coordinated cell; in the CA technology, one user equipment has multiple serving cells, where one may be a primary serving cell, and another may be a secondary serving cell.

It should be noted that this embodiment uses the CoMP transmission technology or the CA technology that is applied to an LTE system as an example to describe the resource allocation method.

Figure 1:
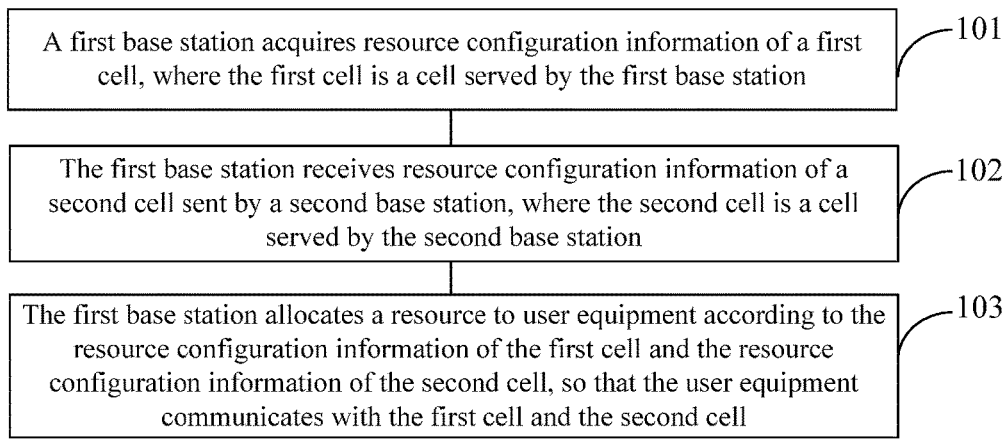
FIG. 1 is a resource allocation method according to an embodiment of the present invention.

An embodiment of the present invention provides a resource allocation method, referring to FIG. 1, including:

101. A first base station acquires resource configuration information of a first cell, where the first cell is a cell served by the first base station.

Exemplarily, each base station may serve one or more cells, and each cell stores resource configuration information that is of the cell and configured by a base station to which the cell belongs.

Optionally, the resource configuration information may include but is not limited to one or more types of the following information: maximum allowable transmit power of a cell, uplink power control common configuration information, uplink sounding reference signal common configuration information, Multimedia Broadcast multicast service Single Frequency Network subframe configuration information, physical uplink shared channel common configuration information, physical downlink shared channel common configuration information, and channel state reference signal configuration information.

Optionally, in a coordinated multi-point CoMP transmission technology, the first cell is a transmission point of user equipment; or in a carrier aggregation CA technology, the first cell is a primary serving cell of user equipment.

Exemplarily, in the CoMP transmission technology, the first cell may be any cell of a CoMP resource management set or a CoMP resource measurement set of user equipment (hereinafter referred to as "first user equipment") or a cell corresponding to any set of CSI-RS configurations of user equipment, that is, the first cell may be a cell corresponding to any transmission point in the CoMP resource management set or the CoMP resource measurement set of the first user equipment; and the first base station may be a base station to which a cell corresponding to any transmission point in the CoMP resource management set or the CoMP resource measurement set of the first user equipment belongs.

In the CA technology, the first cell may be any serving cell of user equipment (hereinafter referred to as "second user equipment"); and the first base station may be a base station to which any serving cell of the second user equipment belongs.

102. The first base station receives resource configuration information of a second cell sent by a second base station, where the second cell is a cell served by the second base station.

Exemplarily, the first cell and the second cell may be cells of coordinated communication of the user equipment or cells of carrier aggregation of the user equipment, that is, the user equipment may be the first user equipment or the second user equipment.

Optionally, in the CoMP transmission technology, the second base station may be, except the first base station, a base station to which a cell corresponding to any transmission point in the CoMP resource management set or the CoMP resource measurement set of the first user equipment belongs; and the second cell may be, except the first cell, a cell corresponding to any transmission point in the CoMP resource management set or the CoMP resource measurement set of the first user equipment.

Optionally, in the CA technology, the second cell may be, except the first cell, any serving cell of the second user equipment; and the second base station may be, except the first base station, a base station to which any serving cell of the second user equipment belongs.

Optionally, the method may further include: receiving, by the first base station, the resource configuration information of the second cell sent by the second base station.

103. The first base station allocates a resource to the user equipment according to the resource configuration information of the first cell and the resource configuration information of the second cell, so that the user equipment communicates with the first cell and the second cell.

Exemplarily, the first base station may be directly or indirectly connected to the second base station by using an X2 interface. For example, the CoMP resource management set or the CoMP resource measurement set of the first user equipment includes cell 1, cell 2, and cell 3, and base stations to which the three cells belong are base station 1, base station 2, and base station 3. It is assumed that base station 1 is the first base station, and base station 3 is the second base station; then base station 1 and base station 3 may be directly connected by using an X2 interface and exchange information; or base station 1 may be connected to base station 2 by using an X2 interface, and base station 2 is connected to base station 3 by using an X2 interface, that is, base station 1 and base station 3 are indirectly connected and exchange information.

Optionally, after step 102, the method may further include: sending the resource configuration information of the first cell to the second base station, so that the second base station allocates a resource to the user equipment according to the resource configuration information of the first cell and the resource configuration information of the second cell.

Exemplarily, any first base station may be used as the second base station, and any second base station may be used as the first base station. Therefore, a process in which the second base station allocates a resource to the user equipment according to the resource configuration information of the first cell and the resource configuration information of the second cell is not repeatedly described in this embodiment.

Optionally, the sending the resource configuration information of the first cell to the second base station may include: sending the resource configuration information of the first cell to the second base station by using an X2 interface.

Further, when the resource configuration information of the second cell is updated, the method may further include: receiving updated resource configuration information of the second cell; and allocating a resource to the user equipment according to the resource configuration information of the first cell and the updated resource configuration information of the second cell.

Optionally, in the CoMP transmission technology, an update of the resource configuration information of the second cell may include: an update of resource configuration information of any transmission point in the CoMP resource management set or the CoMP resource measurement set of the first user equipment, except a transmission point corresponding to the first cell.

Exemplarily, because a base station to which the first cell belongs is the first base station, the first base station may automatically learn updated resource configuration information of the first cell; the first base station may learn the updated resource configuration information of the second cell by receiving the updated resource configuration information of the second cell sent by the second base station, so that the first base station may allocate a resource to the user equipment according to the resource configuration information of the first cell and the updated resource configuration information of the second cell. After receiving the updated resource configuration information of the second cell sent by the second base station, the first base station may send response information to the second base station; when the resource configuration information of the first cell is updated, the response information may be updated resource configuration information of the first cell; when the resource configuration information of the first cell is not updated, the response information may be empty information.

Further, when the resource configuration information of the first cell is updated, the method may further include: sending updated resource configuration information of the first cell to the second base station, so that the second base station allocates a resource to the user equipment according to the updated resource configuration information of the first cell and the resource configuration information of the second cell.

Exemplarily, when the resource configuration information of any transmission point in the CoMP resource management set or the CoMP resource measurement set of the first user equipment is updated, that is, resource configuration information of the cell corresponding to any transmission point in the CoMP resource management set of the first user equipment is updated, abase station to which the cell belongs sends updated resource configuration information of the cell to abase station to which a cell corresponding to another transmission point in the CoMP resource management set or the CoMP resource measurement set belongs, so that the another base station may allocate a resource to the first user equipment according to the updated resource configuration information of the cell.

Optionally, in the CoMP transmission technology, the first cell may be a serving cell of the first user equipment. Correspondingly, the first base station may be a serving base station of the first user equipment, the second cell may be a coordinated cell that is of the first user equipment and corresponds to any transmission point in the CoMP resource management set or the CoMP resource measurement set of the first user equipment, and the second base station may be abase station to which the second cell belongs.

In the CA technology, the first cell may be a primary serving cell (which may be indicated by "PCell") of the second user equipment. Correspondingly, the first base station may be a serving base station of the second user equipment, the second cell may be any secondary serving cell (which may be indicated by "SCell") that is not served by the first base station and participates in the CA technology for the second user equipment, and the second base station may be a base station to which the second cell belongs.

Further, when a cell that communicates with the user equipment is updated, the method further includes:

acquiring, by the first base station, an identifier of the updated cell, and sending the identifier of the updated cell to the second base station; or receiving an identifier of the updated cell sent by the second base station.

Exemplarily, when a cell that is configured by a serving base station and communicates with the user equipment is updated, if the serving base station of the user equipment is the first base station, the first base station sends an identifier of the updated cell to the second base station, so that the second base station learns the updated cell and prepares to acquire resource configuration information of the cell that communicates with the user equipment; if the serving base station of the user equipment is the second base station, the second base station sends an identifier of the updated cell to another second base station and/or the first base station, so that the another second base station and/or the first base station learns the updated cell and prepares to acquire resource configuration information of the cell that communicates with the user equipment.

In the CoMP transmission technology, an update of a cell that communicates with the user equipment may be an increase or decrease of a transmission point in the CoMP resource management set or the CoMP resource measurement set of the user equipment; and in the CA technology, an update of a cell that communicates with the user equipment may be an increase or decrease of a cell of carrier aggregation of the user equipment.

Exemplarily, a set consisting of a base station to which a cell that communicates with the user equipment belongs is referred to as a first set. In the CoMP transmission technology, when a transmission point in the CoMP resource management set or the CoMP resource measurement set of the user equipment is changed, which causes the first set to change, the first base station may only send updated resource configuration information of the first cell to the second base station in an updated first set.

For example, the CoMP resource management set or the CoMP resource measurement set of the user equipment includes cell 1, cell 2, and cell 3, and base stations to which the three cells belong are base station 1, base station 2, and base station 3. It is assumed that base station 1 is the first base station, and base station 2 and base station 3 are the second base stations; then when resource configuration information of cell 1 is updated, updated resource configuration information of cell 1 is sent to base station 2 and base station 3 separately. When cell 4 is added to the CoMP resource management set or the CoMP resource measurement set of the user equipment and abase station to which cell 4 belongs is base station 4, the second base station may include base station 2, base station 3, and base station 4, and in this case, base station 1 also sends the updated resource configuration information of cell 1 to base station 4; when the second base station includes only base station 2, base station 1 may send only information about base station 3 being removed to base station 3 but not send the updated resource configuration information of cell 1 to base station 3.

According to the resource allocation method provided in this embodiment of the present invention, a resource is allocated to user equipment according to resource configuration information of a first cell served by a first base station and that of a second cell served by a second base station. That is, when the first base station allocates a resource, not only resource configuration information of the first base station is considered but also resource configuration information of the second base station is taken into account. By using the method for coordination between base stations, a resource can be properly allocated, between base stations, to the user equipment, which helps improve a peak data rate and a cell throughput or reduce interference.

The following uses a specific embodiment to describe the resource allocation method.

Figure 2:
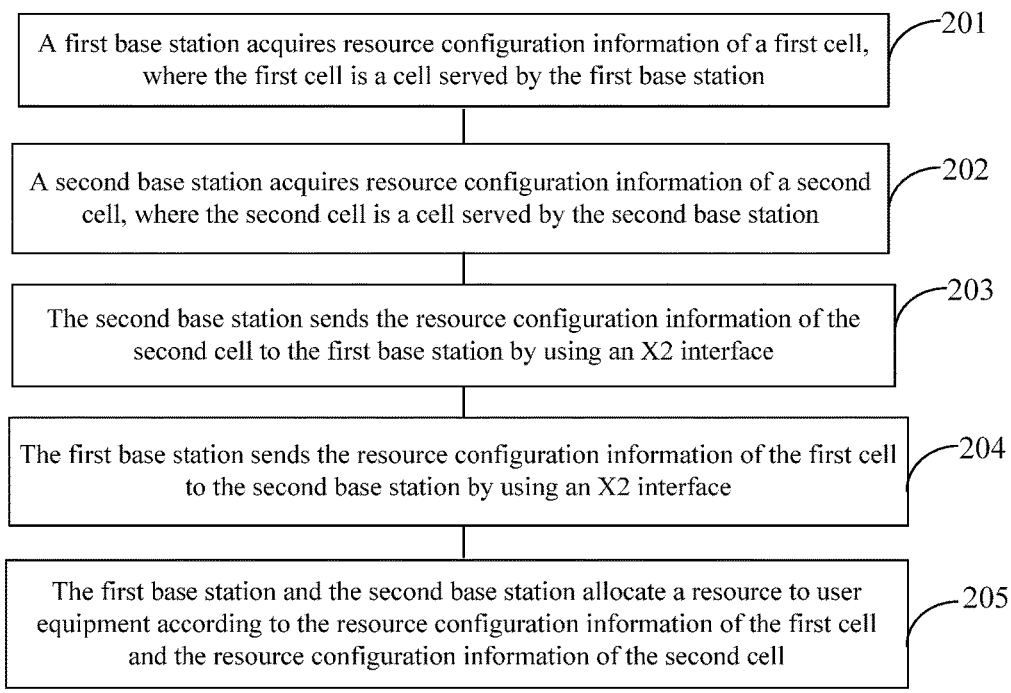
FIG. 2 is another resource allocation method according to an embodiment of the present invention.

Referring to FIG. 2, the method includes:

201. A first base station acquires resource configuration information of a first cell, where the first cell is a cell served by the first base station.

202. A second base station acquires resource configuration information of a second cell, where the second cell is a cell served by the second base station.

203. The second base station sends the resource configuration information of the second cell to the first base station by using an X2 interface.

204. The first base station sends the resource configuration information of the first cell to the second base station by using an X2 interface.

205. The first base station and the second base station allocate a resource to user equipment according to the resource configuration information of the first cell and the resource configuration information of the second cell, so that the user equipment communicates with the first cell and the second cell.

Exemplarily, the resource configuration information may include but is not limited to one or more types of the following information: maximum allowable transmit power of a cell (which may be indicated by "p-Max"), uplink power control common configuration information, uplink sounding reference signal (Sounding Reference Signal, SRS for short) common configuration information, Multimedia Broadcast multicast service Single Frequency Network (Multimedia Broadcast Multicast Service Single Frequency Network, MBSFN for short) subframe configuration information, physical uplink shared channel (Physical Uplink Shared Channel, PUSCH for short) common configuration information, physical downlink shared channel (Physical Downlink Shared Channel, PDSCH for short) common configuration information, channel state reference signal (Channel State Information Reference Signal, CSI-RS for short) configuration information, and the like.

The following separately describes a process in which the first base station allocates a resource to the user equipment according to any one type of resource configuration information listed in the foregoing.

It should be noted that in each following specific embodiment, that the first base station allocates a resource to the user equipment according to the resource configuration information of the first cell and the resource configuration information of the second cell is used as an example for description.

Optionally, when the resource configuration information includes maximum allowable transmit power of a cell, step 205 may include: allocating a resource to the user equipment according to maximum allowable transmit power of the first cell and maximum allowable transmit power of the second cell, so that uplink transmit power of the user equipment does not exceed the maximum allowable transmit power of either of the first cell and the second cell.

Exemplarily, the maximum allowable transmit power of a cell is used for uplink power control and refers to maximum power that can be transmitted in a cell by user equipment (User Equipment, UE for short) and that is broadcasted by the cell. For example, the maximum allowable transmit power of a cell may correspond to maximum allowable UE output power (which may be indicated by "Pemax") configured by a higher-layer protocol layer in the 3rd Generation Partnership Project (3rd Generation Partnership Project, 3GPP for short) or maximum allowable UE output power (which may be indicated by "Pemax,c") that is of serving cell c and that is configured by a higher-layer protocol layer in the 3GPP, where the higher-layer protocol may be the Radio Resource Control (Radio Resource Control, RRC for short) protocol, and Pemax or Pemax,c may be a value from −30 decibel-milliwatts (dBm) to 33 dBm.

Optionally, when the resource configuration information includes uplink power control common configuration information, step 205 may include:

a) sending, by the first base station, uplink power control common configuration information of the first cell and uplink power control common configuration information of the second cell to the user equipment, so that the user equipment UE acquires power headroom report PHR (Power Headroom Report, PHR for short) information according to the uplink power control common configuration information of the first cell and the uplink power control common configuration information of the second cell, where the PHR information includes power headroom information that is of the UE, is in the first cell, and is obtained by calculation according to an average value of each parameter in the uplink power control common configuration information of the first cell and the uplink power control common configuration information of the second cell, or power headroom information that is of the UE, is in the first cell, and is obtained by calculation according to the uplink power control common configuration of a cell with smallest downlink path loss (downlink pathloss) in the first cell and the second cell, or power headroom information of the first cell and power headroom information of the second cell that are obtained by calculation respectively according to the uplink power control common configuration information of the first cell and uplink power control common configuration information of the second cell;

b) receiving the PHR information sent by the user equipment; and c) allocating an uplink resource to the user equipment according to the PHR information.

Exemplarily, the uplink power control common configuration information includes but is not limited to one or more of the following parameters: an uplink power control common configuration parameter (which may be indicated by "uplinkPowerControlCommon") and an uplink power control common configuration parameter (which may be indicated by "UplinkPowerControlCommonSCell-r10") of a secondary serving cell, where the uplink power control common configuration parameter includes nominal physical uplink control channel (Physical Uplink Control Channel, PUCCH for short) reference transmit power (which may be indicated by "p0-Nominal PUCCH"), nominal PUSCH reference transmit power expected to be received by a base station (which may be indicated by "p0-Nominal PUSCH"), a downlink path loss compensation factor (alpha), a PUCCH format power offset configuration (which may be indicated by "deltaFList-PUCCH"), a transmit power offset configuration for a random access preamble and message 3 (which may be indicated by "delta Preamble Msg3"), and the like; and the uplink power control common configuration parameter of a secondary serving cell includes nominal PUSCH reference transmit power (which may be indicated by "p0-Nominal PUSCH"), a downlink path loss compensation factor (alpha), and the like.

Exemplarily, that the user equipment may determine, according to a PHR information manner configured by the first base station, the PHR information is specifically any one of the following three manners: first, determining the PHR information according to an average value of each parameter in the uplink power control common configuration information of the first cell and that of the second cell; second, determining the PHR information according to the uplink power control common configuration information of a cell with smallest downlink path loss in the first cell and the second cell; and third, determining the PHR information according to the uplink power control common configuration information of the first cell and that of the second cell.

The PHR information includes power headroom (Power Headroom, PH for short) of the first cell, or separately includes power headroom PH of the first cell and that of the second cell. The PH may include two types and may be separately acquired by using the following methods:

Type 1: PH=PCMAX,c−PUSCH transmit power, which indicates that physical uplink shared channel PUSCH transmit power is subtracted from maximum transmit power PCMAX,c that is of the UE and is configured in a PCell or a serving cell in an activated state.

Type 2: PH=PCMAX,c−PUSCH transmit power−PUCCH transmit power, which indicates that PUSCH transmit power and PUCCH transmit power are subtracted from maximum transmit power PCMAX,c that is of the UE and is configured in a PCell.

When the PHR information is calculated according to the average value of each parameter in the uplink power control common configuration information of the first cell and that of the second cell, a method for acquiring power headroom PH that is in the first cell by the user equipment is: calculating, by the user equipment, PH and an average value of PUSCH and/or PUCCH transmit power according to average downlink path loss of the first cell and the second cell, the average value of each parameter in the uplink power control common configuration information, and another related parameter. The user equipment acquires power headroom information of type 1 according to the formula PH=PCMAX,c−PUSCH transmit power. Similarly, if the first cell is a primary serving cell in a CA situation, and simultaneous sending of PUSCH and PUCCH is configured on the user equipment, the user equipment may further calculate PUCCH transmit power according to a PUCCH transmit power formula in the 3GPP protocol 36.213, and calculate power headroom information of type 2 according to the formula PH=PCMAX,c−PUSCH transmit power−PUCCH transmit power.

When the PHR information is calculated according to the uplink power control common configuration information of the cell with smallest downlink path loss in the first cell and the second cell, a method for acquiring power headroom that is in the first cell by the user equipment is: calculating, by the user equipment, PH and PUSCH and/or PUCCH transmit power according to the uplink power control common configuration information of the cell with smallest downlink path loss in the first cell and the second cell and another related parameter. For example, downlink path loss of the second cell is the smallest; then the user equipment calculates power headroom information of type 1 and/or type 2 according to the uplink power control common configuration information of the second cell.

When the PHR information is separately calculated according to the uplink power control common configuration information of the first cell and that of the second cell, a method for separately acquiring power headroom PH of the first cell and that of the second cell by the user equipment is: separately calculating, by the user equipment, power headroom information of type 1 and/or type 2, of the UE, in the first cell according to the uplink power control common configuration information of the first cell, and calculating power headroom information of type 1 and/or type 2, of the UE, in the second cell according to the uplink power control common configuration information of the second cell.

In the three methods for acquiring power headroom PH, a method for estimating downlink path loss of a cell by the UE is: reference signal power (Reference Signal Power)—reference signal received power (Reference Signal Received Power, RSRP for short) filtered by a higher layer (generally referring to a radio resource control RRC protocol layer), where the reference signal power is actual reference signal transmit power and may be configured for the UE by a serving base station by using RRC.

Exemplarily, that the first base station allocates an uplink resource to the user equipment according to the PHR information may include that: if the PH is relatively small or uplink path loss is relatively large, in subsequent scheduling of the user equipment, the first base station may allocate a relatively small quantity of uplink physical resource blocks and a lower-order modulation and coding scheme (Modulation and Coding Scheme, MCS for short) to the user equipment; if the PH is relatively large or uplink path loss is relatively small, in subsequent scheduling of the user equipment, the first base station may allocate a relatively large quantity of uplink physical resource blocks and a higher-order MCS to the user equipment. In addition, generally, some other factors are further considered in resource allocation for the user equipment, such as a Quality of Service requirement (Quality of Service, QoS for short) of a service scheduled by the user equipment, a service volume, equity for another user equipment, a load situation of a cell, and the like.

Optionally, when the resource configuration information includes uplink sounding reference signal SRS common configuration information (which may be indicated by "SoundingRS-UL-Config"), step 205 may include: allocating an uplink resource to the user equipment, where a symbol location occupied by the uplink resource does not include a symbol location that is in a subframe and is occupied by an uplink sounding reference signal resource of either of the first cell and the second cell.

Exemplarily, the SRS common configuration information includes but is not limited to one or more of the following parameters: a SRS bandwidth configuration (which may be indicated by "srs-BandwidthConfig"), a SRS subframe configuration (which may be indicated by "srs-SubframeConfig"), a configuration of whether to simultaneously send an SRS and a hybrid automatic repeat request (Hybrid Automatic Repeat Request, HARQ for short) feedback information acknowledgement/non-acknowledgement (ACK/NACK) (which may be indicated by "ackNackSRS-SimultaneousTransmission"), an uplink special subframe SRS configuration (which may be indicated by "srs-MaxUpPts"), and the like.

For example, base station 1 is the first base station, base station 2 is the second base station, a cell served by base station 1 is cell 1, cells served by base station 2 are cell 2 and cell 3, and the first, third, and fifth transmission subframes are configured for SRS resources of cell 1, cell 2, and cell 3 respectively, then when base station 1 allocates an uplink resource to the first user equipment, symbol locations that are in the first, third, and fifth transmission subframes and are occupied by the SRS resources are avoided, that is, no uplink resource is allocated, to the user equipment, in the symbol locations that are in the three subframes and are occupied by the SRS resources. When the first cell and the second cell jointly receive a PUSCH, it is determined, according to SRS common configuration information of the first cell and that of the second cell, that the symbol locations occupied by the SRS resources are excluded during decoding.

Optionally, when the resource configuration information includes Multimedia Broadcast multicast service Single Frequency Network MBSFN subframe configuration information, step 205 may include: allocating a downlink resource to the user equipment, where a subframe occupied by the downlink resource does not include a Multimedia Broadcast multicast service Single Frequency Network subframe that is of either of the first cell and the second cell and is occupied by a Multimedia Broadcast multicast service (Multimedia Broadcast multicast service, MBMS); or when no Multimedia Broadcast multicast service uses a Multimedia Broadcast multicast service Single Frequency Network subframe of the first cell or that of the second cell, allocating, in a Multimedia Broadcast multicast service Single Frequency Network subframe of the first cell or that of the second cell, a downlink resource to the user equipment.

Exemplarily, the MBSFN subframe configuration information includes but is not limited to one or more of the following parameters: a radio frame allocation period (which may be indicated by "radioframeAllocationPeriod"), a radio frame allocation offset (which may be indicated by "radioframeAllocationOffset"), subframe allocation (which may be indicated by "subframeAllocation"), and other information.

If an MBMS service uses an MBSFN subframe, in downlink (downlink, DL for short) CoMP joint transmission (Joint Transmission, JT for short) or a dynamic point selection (Dynamic Point Selection, DPS for short) operation, because the MBSFN subframe is used in the MBMS service, when a base station sends a unicast service on a PDSCH in a JT or DPS manner, the MBSFN subframe cannot be used again; otherwise, a UE receiving error is caused.

If an MBMS service does not use an MBSFN subframe, because the MBSFN subframe does not have a cell reference signal (Cell Reference Signal, CRS for short) in a data domain, when a base station sends a unicast service on a PDSCH in a JT or DPS manner, a problem of conflict in user data and a CRS position is not caused, and therefore a resource of the MBSFN subframe can be used.

Optionally, when the resource configuration information includes physical uplink shared channel PUSCH common configuration information, step 205 may include: allocating an uplink resource to the user equipment according to physical uplink shared channel common configuration information of the first cell and physical uplink shared channel common configuration information of the second cell.

Exemplarily, the PUSCH common configuration information includes but is not limited to one or more of the following parameters: a PUSCH basic configuration (which may be indicated by "pusch-ConfigBasic"), a PUSCH reference signal configuration (which may be indicated by "ul-ReferenceSignalsPUSCH"), and other information, where the PUSCH common configuration includes a subband size configuration (which may be indicated by "n-SB"), a hopping mode configuration (which may be indicated by "hoppingMode"), a PUSCH hopping offset (which may be indicated by "pusch-HoppingOffset"), whether 64 quadrature amplitude modulation (which may be indicated by "enable 64QAM") is enabled, and the like.

Exemplarily, a hopping mode in a joint receiving TJ situation is used as an example for description. When the first base station allocates an uplink resource to the user equipment, it is required that hopping modes supported by the first cell and the second cell that perform coordinated communication with the user equipment are the same. If one of the cells does not support a hopping mode or supports a hopping mode different from that of the other cell, the cell cannot properly receive the uplink resource. For example, the first cell and the second cell that perform coordinated communication with the user equipment include: cell 1, cell 2, and cell 3. Cell 1 and cell 2 support 64 quadrature amplitude modulation (64 Quadrature Amplitude Modulation, 64 QAM for short), and cell 3 does not support 64 QAM. If the first base station selects 64 QAM when allocating an uplink resource to the first user equipment, cell 1 and cell 2 can correctly and jointly receive a PUSCH, but cell 3 cannot correctly receive the PUSCH.

Optionally, when the resource configuration information includes physical downlink shared channel PDSCH common configuration information, step 205 may include: allocating a downlink resource to the user equipment according to physical downlink shared channel common configuration information of the first cell and physical downlink shared channel common configuration information of the second cell.

Exemplarily, the PDSCH common configuration information includes but is not limited to one or more of the following parameters: reference signal power (which may be indicated by "referenceSignalPower"), a ratio or an offset of energy per resource element (Energy Per Resource Element, EPRE for short) of a PDSCH in a same symbol column as a cell specific reference signal to energy per resource element of a CRS (which may be indicated by "p-b"), and the like.

Exemplarily, in a joint receiving JT situation, the first base station may select an offset value of a cell that is with a relatively small offset configuration and that is one of the first cell and the second cell, and allocate a downlink resource to the user equipment according to the offset value; or may allocate a downlink resource to the user equipment by using a same offset value by negotiation. In a dynamic point selection point DPS situation, the first base station allocates a downlink resource to the user equipment according to PDSCH common configuration information of a selected cell.

Optionally, when the resource configuration information includes channel state reference signal CSI-RS configuration information, step 205 may include:

a) sending channel state reference signal configuration information CSI-RS of the first cell and channel state reference signal configuration information CSI-RS of the second cell to the user equipment, so that the user equipment acquires reference signal received power (Reference Signal Received Power, RSRP for short) and/or channel state information (Channel State Information, CSI information for short) according to the channel state reference signal configuration information of the first cell and the channel state reference signal configuration information of the second cell;

b) receiving the RSRP and/or CSI information sent by the user equipment; and c) allocating a downlink resource to the first user equipment according to the RSRP and/or CSI information.

Exemplarily, the CSI-RS configuration information includes but is not limited to one or more of the following parameters: an antenna port (which may be indicated by "antennaPortsCount"), a resource configuration (which may be indicated by "resourceConfig"), a subframe configuration (which may be indicated by "subframeConfig"), CSI-RS reference signal power, a ratio or an offset of PDSCH energy per resource element to CSI-RS energy per resource element, and the like.

Exemplarily, the user equipment measures RSRP and/or CSI information of the first cell and that of the second cell based on a CSI-RS. When allocating a downlink resource to the user equipment, the first base station avoids a CSI-RS resource of the first cell and that of the second cell, determines channel quality of the first cell and the second cell according to received RSRP and/or CSI information, and allocates a corresponding downlink resource.

When a resource is allocated to the user equipment, if mere common configuration information of one cell served by the first base station is considered, the user equipment may not correctly receive downlink information sent by another cell that participates in joint sending or carrier aggregation; In another aspect, another cell that participates in joint receiving or carrier aggregation may not correctly receive uplink information sent by the user equipment. Due to these problems, a CoMP or CA operation cannot be effectively performed and as a result an advantage provided by CoMP or CA cannot be utilized. In a situation that a CoMP operation cannot be effectively supported, the UE may be subject to strong interference on a cell edge, and even cannot properly send or receive information in a serving cell of the UE; and in a situation that CA cannot be effectively supported, information cannot be properly sent or received between the user equipment and multiple cells at the same time, and therefore a peak data rate and a throughput cannot be improved.

According to the resource allocation method provided in this embodiment of the present invention, a resource is allocated to user equipment according to resource configuration information of a first cell served by a first base station and that of a second cell served by a second base station. That is, when the first base station allocates a resource, not only resource configuration information of the first base station is considered but also resource configuration information of the second base station is taken into account. By using the method for coordination between base stations, a resource can be properly allocated, between base stations, to user equipment, which helps improve a peak data rate and a cell throughput or reduce interference.

Figure 3:
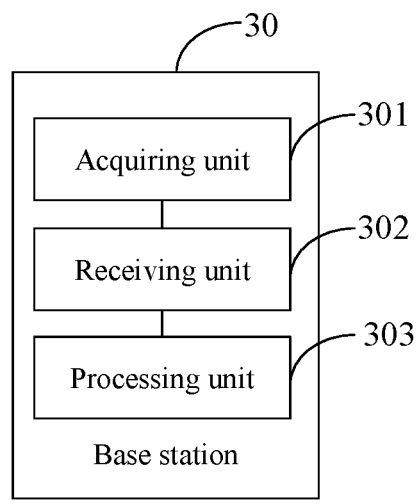
FIG. 3 is a base station according to an embodiment of the present invention.

An embodiment of the present invention provides a base station 30. The base station 30 may be the first base station in the foregoing method embodiments and is configured to execute the resource allocation method shown in FIG. 1. Referring to FIG. 3, the base station 30 includes: an acquiring unit 301, a receiving unit 302, and a processing unit 303.

The acquiring unit 301 is configured to acquire resource configuration information of a first cell, where the first cell is a cell served by the base station; and transmit the resource configuration information of the first cell to the processing unit 303.

The receiving unit 302 is configured to receive resource configuration information of a second cell of a second base station and transmit the resource configuration information of the second cell to the processing unit 303, where the second cell is a cell served by the second base station.

The processing unit 303 is configured to allocate a resource to the user equipment according to the resource configuration information of the first cell transmitted by the acquiring unit 301 and the resource configuration information of the second cell transmitted by the receiving unit 302, so that the user equipment communicates with the first cell and the second cell.

The resource configuration information includes at least one of the following:

maximum allowable transmit power of a cell, uplink power control common configuration information, uplink sounding reference signal common configuration information, Multimedia Broadcast multicast service Single Frequency Network subframe configuration information, physical uplink shared channel common configuration information, physical downlink shared channel common configuration information, and channel state reference signal configuration information.

Figure 4:
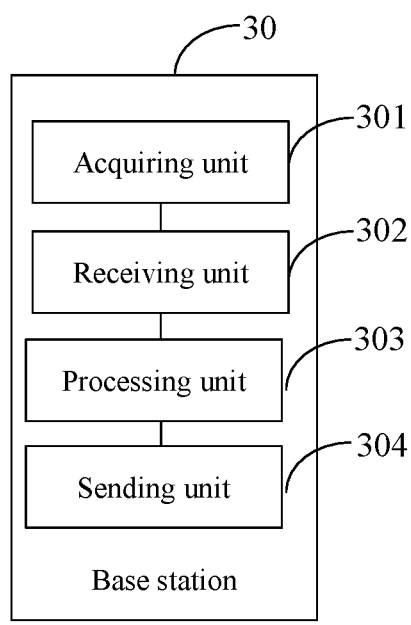
FIG. 4 is another base station according to an embodiment of the present invention.

Optionally, referring to FIG. 4, the base station may further include:

a sending unit 304, configured to send the resource configuration information of the first cell to the second base station, so that the second base station allocates a resource to the user equipment according to the resource configuration information of the first cell and the resource configuration information of the second cell.

Further, when the resource configuration information of the second cell is updated, the receiving unit 302 may be further configured to receive updated resource configuration information of the second cell; and the processing unit 303 may be further configured to allocate a resource to the user equipment according to the resource configuration information of the first cell and the updated resource configuration information of the second cell.

Further, when the resource configuration information of the first cell is updated, the sending unit 304 may be further configured to send updated resource configuration information of the first cell to the second base station, so that the second base station allocates a resource to the user equipment according to the updated resource configuration information of the first cell and the resource configuration information of the second cell.

Further, when a cell that communicates with the user equipment is updated, the acquiring unit 301 may be further configured to acquire an identifier of the updated cell; and the sending unit 304 may be further configured to send the identifier of the updated cell to the second base station; or when a cell that communicates with the user equipment is updated, the receiving unit 302 may be further configured to receive an identifier of the updated cell sent by the second base station.

Optionally, when the resource configuration information includes maximum allowable transmit power of a cell, the processing unit 303 may be specifically configured to allocate a resource to the user equipment according to maximum allowable transmit power of the first cell and maximum allowable transmit power of the second cell, so that uplink transmit power of the user equipment does not exceed the maximum allowable transmit power of either of the first cell and the second cell.

Optionally, when the resource configuration information includes uplink power control common configuration information, the processing unit 303 may be specifically configured to send uplink power control common configuration information of the first cell and uplink power control common configuration information of the second cell to the user equipment, so that the user equipment acquires power headroom report PHR information according to the uplink power control common configuration information of the first cell and that of the second cell, where the PHR information includes power headroom of the first cell and/or that of the second cell; receive the PHR information sent by the user equipment; and allocate an uplink resource to the user equipment according to the PHR information.

Optionally, when the resource configuration information includes uplink sounding reference signal common configuration information, the processing unit 303 may be specifically configured to allocate an uplink resource to the user equipment, where a symbol location occupied by the uplink resource does not include a symbol location that is in a subframe and that is occupied by an uplink sounding reference signal resource of either of the first cell and the second cell.

Optionally, when the resource configuration information includes Multimedia Broadcast multicast service Single Frequency Network subframe configuration information, the processing unit 303 may be specifically configured to allocate a downlink resource to the user equipment, where a subframe occupied by the downlink resource does not include a Multimedia Broadcast multicast service Single Frequency Network subframe that is of either of the first cell and the second cell and is occupied by a Multimedia Broadcast multicast service; or when no Multimedia Broadcast multicast service uses a Multimedia Broadcast multicast service Single Frequency Network subframe of the first cell or that of the second cell, allocate, in a Multimedia Broadcast multicast service Single Frequency Network subframe of the first cell or that of the second cell, a downlink resource to the user equipment.

Optionally, when the resource configuration information includes physical uplink shared channel common configuration information, the processing unit 303 may be specifically configured to allocate an uplink resource to the user equipment according to physical uplink shared channel common configuration information of the first cell and physical uplink shared channel common configuration information of the second cell.

Optionally, when the resource configuration information includes physical downlink shared channel common configuration information, the processing unit 303 may be specifically configured to allocate a downlink resource to the user equipment according to physical downlink shared channel common configuration information of the first cell and physical downlink shared channel common configuration information of the second cell.

Optionally, when the resource configuration information includes channel state reference signal configuration information, the processing unit 303 may be specifically configured to send channel state reference signal configuration information of the first cell and channel state reference signal configuration information of the second cell to the user equipment, so that the user equipment acquires reference signal received power and/or channel state information according to the channel state reference signal configuration information of the first cell and the channel state reference signal configuration information of the second cell; receive the reference signal received power and/or channel state information sent by the user equipment; and allocate a downlink resource to the user equipment according to the reference signal received power and/or channel state information.

Optionally, in a coordinated multi-point CoMP transmission technology, the first cell or the second cell is a transmission point of the user equipment; or in a carrier aggregation CA technology, the first cell or the second cell is a serving cell of the user equipment.

According to the base station provided in this embodiment of the present invention, a resource is allocated to user equipment according to resource configuration information of a first cell served by the base station and that of a second cell served by a second base station. That is, when the base station allocates a resource, not only resource configuration information of the base station is considered but also resource configuration information of the second base station is taken into account. By using the method for coordination between base stations, a resource can be properly allocated, between base stations, to user equipment, which helps improve a peak data rate and a cell throughput or reduce interference.

Figure 5:
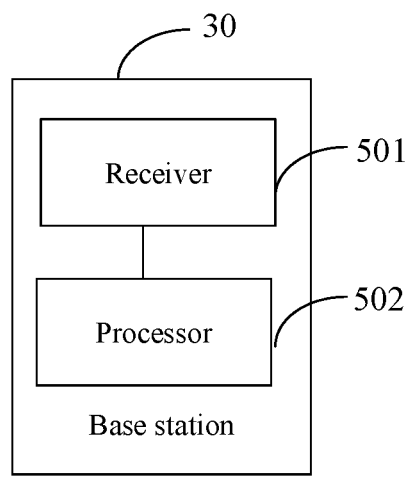
FIG. 5 is another base station according to an embodiment of the present invention.

An embodiment of the present invention further provides a base station 30. The base station 30 is the first base station in the foregoing embodiments and is configured to execute the resource allocation method shown in FIG. 1. Referring to FIG. 5, the base station 30 includes: a receiver 501 and a processor 502 connected to the receiver 501.

The receiver 501 is configured to receive resource configuration information of a second cell of a second base station, where the second cell is a cell served by the second base station.

The processor 502 is configured to acquire resource configuration information of a first cell, where the first cell is a cell served by the base station; and allocate a resource to user equipment according to the resource configuration information of the first cell and the resource configuration information of the second cell, so that the user equipment communicates with the first cell and the second cell.

The resource configuration information includes at least one of the following:

maximum allowable transmit power of a cell, uplink power control common configuration information, uplink sounding reference signal common configuration information, Multimedia Broadcast multicast service Single Frequency Network subframe configuration information, physical uplink shared channel common configuration information, physical downlink shared channel common configuration information, and channel state reference signal configuration information.

Figure 6:
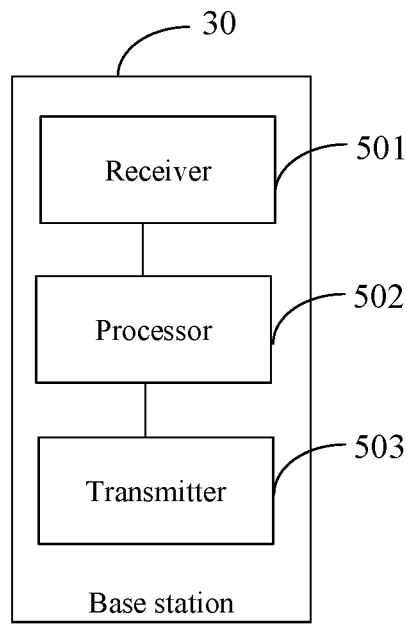
FIG. 6 is another base station according to an embodiment of the present invention.

Optionally, referring to FIG. 6, the base station may further include:

a transmitter 503, configured to send the resource configuration information of the first cell to the second base station, so that the second base station allocates a resource to the user equipment according to the resource configuration information of the first cell and the resource configuration information of the second cell.

Further, when the resource configuration information of the second cell is updated, the receiver 501 may be further configured to receive updated resource configuration information of the second cell; and the processor 502 may be further configured to allocate a resource to the user equipment according to the resource configuration information of the first cell and the updated resource configuration information of the second cell.

Further, when the resource configuration information of the first cell is updated, the transmitter 503 may be further configured to send updated resource configuration information of the first cell to the second base station, so that the second base station allocates a resource to the user equipment according to the updated resource configuration information of the first cell and the resource configuration information of the second cell.

Further, when a cell that communicates with the user equipment is updated, the processor 502 may be further configured to acquire an identifier of the updated cell; and the transmitter 503 may be further configured to send the identifier of the updated cell to the second base station; or when a cell that communicates with the user equipment is updated, the receiver 501 may be further configured to receive an identifier of the updated cell sent by the second base station.

Optionally, when the resource configuration information includes maximum allowable transmit power of a cell, the processor 502 may be specifically configured to allocate a resource to the user equipment according to maximum allowable transmit power of the first cell and maximum allowable transmit power of the second cell, so that uplink transmit power of the user equipment does not exceed the maximum allowable transmit power of either of the first cell and the second cell.

Optionally, when the resource configuration information includes uplink power control common configuration information, the processor 502 may be specifically configured to send uplink power control common configuration information of the first cell and uplink power control common configuration information of the second cell to the user equipment, so that the user equipment acquires power headroom report PHR information according to the uplink power control common configuration information of the first cell and that of the second cell, where the PHR information includes power headroom of the first cell and/or that of the second cell; receive the PHR information sent by the user equipment; and allocate an uplink resource to the user equipment according to the PHR information.

Optionally, when the resource configuration information includes uplink sounding reference signal common configuration information, the processor 502 may be specifically configured to allocate an uplink resource to the user equipment, where a symbol location occupied by the uplink resource does not include a symbol location that is in a subframe and that is occupied by an uplink sounding reference signal resource of either of the first cell and the second cell.

Optionally, when the resource configuration information includes Multimedia Broadcast multicast service Single Frequency Network subframe configuration information, the processor 502 may be specifically configured to allocate a downlink resource to the user equipment, where a subframe occupied by the downlink resource does not include a Multimedia Broadcast multicast service Single Frequency Network subframe that is of either of the first cell and the second cell and is occupied by a Multimedia Broadcast multicast service; or when no Multimedia Broadcast multicast service uses a Multimedia Broadcast multicast service Single Frequency Network subframe of the first cell or that of the second cell, allocate, in a Multimedia Broadcast multicast service Single Frequency Network subframe of the first cell or that of the second cell, a downlink resource to the user equipment.

Optionally, when the resource configuration information includes physical uplink shared channel common configuration information, the processor 502 may be specifically configured to allocate an uplink resource to the user equipment according to physical uplink shared channel common configuration information of the first cell and physical uplink shared channel common configuration information of the second cell.

Optionally, when the resource configuration information includes physical downlink shared channel common configuration information, the processing unit 502 may be specifically configured to allocate a downlink resource to the user equipment according to physical downlink shared channel common configuration information of the first cell and physical downlink shared channel common configuration information of the second cell.

Optionally, when the resource configuration information includes channel state reference signal configuration information, the processor 502 may be specifically configured to send channel state reference signal configuration information of the first cell and channel state reference signal configuration information of the second cell to the user equipment, so that the user equipment acquires reference signal received power and/or channel state information according to the channel state reference signal configuration information of the first cell and the channel state reference signal configuration information of the second cell; receive the reference signal received power and/or channel state information sent by the user equipment; and allocate a downlink resource to the user equipment according to the reference signal received power and/or channel state information.

Optionally, in a coordinated multi-point CoMP transmission technology, the first cell or the second cell is a transmission point of the user equipment; or in a carrier aggregation CA technology, the first cell or the second cell is a serving cell of the user equipment.

According to the base station provided in this embodiment of the present invention, a resource is allocated to user equipment according to resource configuration information of a first cell served by the base station and that of a second cell served by a second base station. That is, when the base station allocates a resource, not only resource configuration information of the base station is considered but also resource configuration information of the second base station is taken into account. By using the method for coordination between base stations, a resource can be properly allocated, between base stations, to user equipment, which helps improve a peak data rate and a cell throughput or reduce interference.

It may be clearly understood by a person skilled in the art that, for the purpose of convenient and brief description, for a detailed working process of the foregoing apparatus and unit, reference may be made to a corresponding process in the foregoing method embodiments, and details are not described herein again.

In the several embodiments provided in the present application, it should be understood that the disclosed apparatus and method may be implemented in other manners. For example, the described apparatus embodiment is merely exemplary. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. A part or all of the units may be selected according to actual needs to achieve the objectives of the solutions of the embodiments.

In addition, functional units in the embodiments of the present invention may be integrated into one processing unit, or each of the units may exist alone physically, or two or more units are integrated into one unit. The integrated unit may be implemented in a form of hardware, or may be implemented in a form of hardware in addition to a software functional unit.

When the foregoing integrated unit is implemented in a form of a software functional unit, the integrated unit may be stored in a computer-readable storage medium. The software functional unit is stored in a storage medium and includes several instructions for instructing a computer device (which may be a personal computer, a server, or a network device) to perform a part of the steps of the methods described in the embodiments of the present invention. The foregoing storage medium includes: any medium that can store program code, such as a USB flash drive, a removable hard disk, a read-only memory (Read-Only Memory, ROM), a random access memory (Random Access Memory, RAM), a magnetic disk, or an optical disc.

Finally, it should be noted that the foregoing embodiments are merely intended for describing the technical solutions of the present invention other than limiting the present invention. Although the present invention is described in detail with reference to the foregoing embodiments, persons of ordinary skill in the art should understand that they may still make modifications to the technical solutions described in the foregoing embodiments or make equivalent replacements to some technical features thereof, without departing from the spirit and scope of the technical solutions of the embodiments of the present invention.

What is claimed is:

1. A method, comprising:
    obtaining, by a first base station, first uplink power control common configuration information of a first cell, wherein the first cell is a cell served by the first base station;
    receiving, by the first base station, second uplink power control common configuration information of a second cell sent from a second base station, wherein the second cell is a cell served by the second base station;
    sending, by the first base station, the first uplink power control common configuration information of the first cell and the second uplink power control common configuration information of the second cell to a terminal; and
    receiving, by the first base station, power headroom report (PHR) information from the terminal.

2. The method according to claim 1, further comprising:
    allocating, by the first base station, an uplink resource to the terminal according to the PHR information.

3. The method according to claim 1, further comprising:
    receiving, by the first base station, maximum allowable transmit power of the second cell from the second base station.

4. The method according to claim 3, further comprising:
    allocating, by the first base station, the uplink resource to the terminal according to the PHR information and the maximum allowable transmit power of the second cell.

5. The method according to claim 1, wherein the PHR information comprises at least one of:
    power headroom of the first cell; and
    power headroom of the second cell.

6. An apparatus comprising:
    at least one processor configured to:
        obtain first uplink power control common configuration information of a first cell, wherein the first cell is a cell served by a first base station;
        receive second uplink power control common configuration information of a second cell from a second base station, wherein the second cell is a cell served by the second base station,
        send the first uplink power control common configuration information of the first cell and the second uplink power control common configuration information of the second cell to a terminal, and
        receive a power headroom report (PHR) information from the terminal; and
    a memory coupled to the at least one processor.

7. The apparatus according to claim 6, wherein the at least one processor is further configured to:
    allocate an uplink resource to the terminal according to the PHR information.

8. The apparatus according to claim 6, wherein the at least one processor is further configured to:
    receive maximum allowable transmit power of the second cell from the second base station.

9. The apparatus according to claim 8, wherein the at least one processor is further configured to:
    allocate the uplink resource to the terminal according to the PHR information and the maximum allowable transmit power of the second cell.

10. The apparatus according to claim 6, wherein the PHR information comprises at least one of:
    power headroom of the first cell; and
    power headroom of the second cell.

11. The apparatus according to claim 6, wherein the apparatus is part of the first base station.

12. An apparatus comprising:
    at least one processor configured to:
        receive first uplink power control common configuration information of a first cell and second uplink power control common configuration information of a second cell from a first base station, the first cell being a cell served by the first base station, the second cell being a cell served by a second base station,
        acquire power headroom report (PHR) information according to the first and the second uplink power control common configuration information, and
        send the PHR information to the first base station; and
    a memory coupled to the at least one processor.

13. The apparatus according to claim 12, wherein the PHR information comprises at least one of:
    power headroom of the first cell; and
    power headroom of the second cell.

14. The apparatus according to claim 13, wherein the power headroom comprises at least one of:
    type 1 power headroom; and
    type 2 power headroom.

15. The apparatus according to claim 14, wherein:
    the type 1 power headroom is obtained by physical uplink shared channel (PUSCH) transmit power subtracted from maximum transmit power (PCMAX, c); or
    the type 2 power headroom is obtained by both PUSCH transmit power and physical uplink control channel (PUCCH) transmit power subtracted from PCMAX,c.

16. The apparatus according to claim 15, wherein the at least one processor is further configured to configure the PCMAX, c in a primary cell (PCell) or a serving cell in an activated state.

17. The apparatus according to claim 12, wherein:
    in a coordinated multi-point (CoMP) transmission technology, both of the first cell and the second cell are transmission points of the apparatus; or
    in a carrier aggregation (CA) technology, both of the first cell and the second cell are serving cells of the apparatus; or
    in a dual connectivity (DC) technology, the first cell is a primary cell (PCell) and the second cell is a primary secondary cell (PSCell).

18. A non-transitory computer-readable storage medium comprising instructions, that when executed by at least one processor, cause the at least one processor to:
    receive first uplink power control common configuration information of a first cell and second uplink power control common configuration information of a second cell from a first base station, the first cell being a cell served by the first base station, the second cell being a cell served by a second base station;

acquire power headroom report (PHR) information according to the first and the second uplink power control common configuration information; and send the PHR information to the first base station.

19. The non-transitory computer-readable storage medium according to claim 18, wherein the PHR information comprises at least one of:

power headroom of the first cell; and power headroom of the second cell.

20. The non-transitory computer-readable storage medium according to claim 18, wherein the power headroom comprises at least one of:

type 1 power headroom; and type 2 power headroom.

\* \* \* \* \*